Jan. 31, 1967　　　W. B. ANDREASEN　　　3,300,825
CABLE TIE AND ANCHOR
Filed April 30, 1965
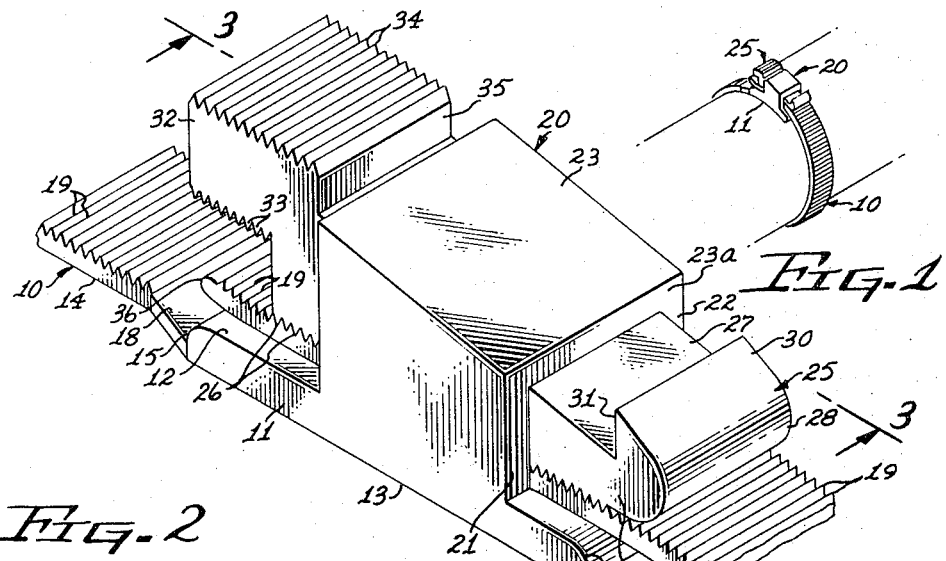
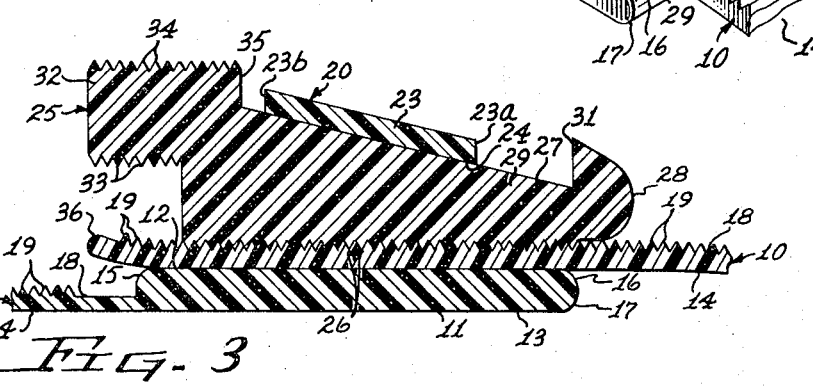
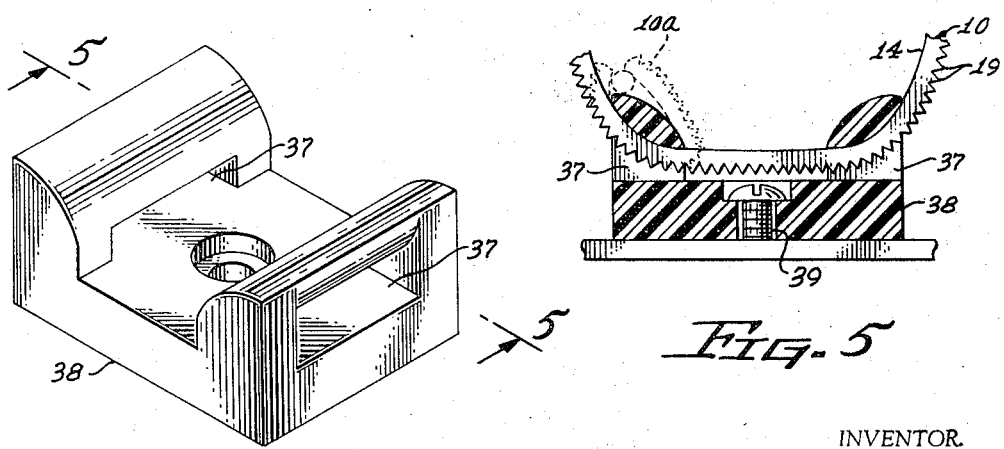
INVENTOR.
WERNER BRANDT ANDREASEN
BY
Willard S. Gwinn
ATTORNEY

United States Patent Office 3,300,825
Patented Jan. 31, 1967

---

3,300,825
CABLE TIE AND ANCHOR
Werner Brandt Andreasen, Fairbanks, Alaska
(FAA Rapcon, CMR-5, A.P.O. Seattle, Wash. 98737)
Filed Apr. 30, 1965, Ser. No. 452,075
3 Claims. (Cl. 24—16)

This invention pertains to certain new and useful improvements in a wedge-lock band clamp and is particularly directed to a cable tie and anchor especially adapted for use in permanently clamping a bundle of electrical cables or conductor wires together.

One of the objects of this invention is to provide a cable tie that has the smooth side of the band inside and contacting the wires so that it can cinch them up without damaging the insulation or catching and binding on the wire preventing tightening up of the cable tie.

Still another object is to provide a cable tie with a wedge-lock in which under no conditions will the cable come loose from the cable tie until its wedge is loosened manually even though the cable may press up against the wedge-lock.

A further object is to provide a cable tie with simple construction and easier and cheaper to manufacture.

It is also a further object to provide a cable tie that is easier and quicker to release from tie-up position without irritating or injuring the hands of the user.

Further features and advantages of this invention will appear from a detailed description of the drawings in which:

FIG. 1 is a perspective view showing the cable tie in use supporting a bundle of wires.

FIG. 2 is an enlarged fragmentary view of the wedge-lock band clamp incorporating the features of this invention.

FIG. 3 is a sectional view on the line 3—3 of FIG. 2.

FIG. 4 is an enlarged perspective view of the cable tie anchor.

FIG. 5 is a sectional view on the line 5—5 of FIG. 4.

As an example of one embodiment of this invention, there is shown a cable tie and anchor comprising an elongated strap 10 on the end of which is a platen 11 having a smooth outer surface 12 and a smooth inside surface 13 merging with the smooth inside cable engaging surface 14 of the strap 10. The ends of the surface are rounded off at 15 and 16 and the outer end of the platen 11 is further rounded off at 17 adjacent its inside surface 13.

The outside surface 18 of the strap 10 is provided with a series of serrations 19. A locking yoke 20 forming a wedge receiving opening comprising the side portions 21 and 22 are formed integral with the side edges of the platen 11 and are tied together at their outer ends by the thrust plate 23 having a sloping smooth abutment surface 24 converging toward the surface 12 of the platen 11 in the direction of its outer free end 16–17.

A locking wedge 25 is provided with serrations 26 which matingly engage the serrations 19 on the outside of the strap 10. A smooth sloping abutment surface 27 on the wedge engages the mating sloping abutment surface 24 of the thrust plate 23 so that when the wedge 25 moves to the right, FIG. 2, the serrations 26 on the bottom of the wedge will be urged into the serrations 19 of the strap 10 to prevent the strap from being pulled from the platen 11 and yoke 20 so as to hold the strap in cinched up position. A smooth rounded heel surface 28 is formed on the small end 29 of the wedge together with a projecting stop lug portion 30 having an abutment surface 31 adapted to engage the transverse surface 23a of the thrust plate 23. The other big end of the wedge 25 is provided with a manipulating extension portion 32 having finger grip serrations 33 and 34 and an abutment surface 35 adapted to engage the other transverse surface 23b on the thrust plate 23, the surfaces 31 and 35 serving to normally confine the movement of the wedge 25 within the yoke 20.

In order to release the cable tie from cinched up position, the outer free end 36 of the strap 10 is pulled to the left, FIG. 2, causing wedge 25 to move to the left to release engagement of its sloping abutment surface 27 from the surface 24 of the thrust plate 23. The extension portion 32 on the big end of the wedge 25 is then lifted up so that the smooth rounded heel surface 28 engages the top edges of the serrations 19 of the strap causing the serrations 26 of the wedge 25 to be lifted from the serrations 19 of the strap 10 so that the strap can be readily pulled over the platen 11 and from under the wedge 25 and out of the yoke 20 to open the strap 10 and release the cables, the rounded surface 28 of the wedge riding smoothly on the tops of the serrations 19 so as to in no way impede the withdrawal of the free end of the strap 10.

It will be noted with this construction of the serrations on outside of the strap, no damage or abrasion will result to the cables during cinch up and release of the strap. This arrangement further provides a more positive finger grip on the outside of the strap when gripping it when cinching up the strap that if the serrations were on the inside thereof.

It is to be further noted that since the smooth side of the strap is turned inward, an additional advantage of this invention is that it may be easily passed through the slots 37 of an anchoring device 38 secured to a structure by a suitable screw 39 and cinches up without binding in any way. When a very small cable or few wires are to be secured, the strap 10 need be passed only though one slot 37, as shown in broken line at 10a in FIG. 5.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cable tie and anchor comprising in combination:
   (A) an elongated flexible strap having
   (B) a series of serrations spaced longitudinally on the outside surface of said strap and having a smooth inside surface,
   (C) a platen formed on one end of said strap having a smooth outer surface,
   (D) a locking yoke on said platen above said smooth outer surface of said platen having a smooth surface wedge-receiving opening,
   (E) a locking wedge within said wedge-receiving opening having serrations on one face engaging said serrations on the outside of said strap and smooth sloping surface engaging said locking yoke,
   (F) a smooth rounded surface on the small end of said locking wedge,
   (G) and a manipulating extension portion on the large end of said locking wedge for releasing and tipping up said wedge to engage said smooth rounded surface against said serrations on said strap to release said serrations on said wedge from said serrations on said strap.

2. A cable tie and anchor comprising in combination:
   (A) an elongated flexible strap having,
   (B) a series of serrations spaced longitudinally on the outside surface of said strap and having a smooth inside surface, (C) a platen formed on one end of said strap having a smooth outer surface, (D) a locking yoke on said platen above said smooth outer surface of said platen having a smooth surface wedge-receiving opening, (E) a locking wedge within said wedge-receiving opening having serrations on one face engaging said serrations on the outside of said strap and a smooth sloping surface engaging said locking yoke, (F) a smooth rounded surface on the small end of said locking wedge, (G) a manipulating extension portion on the large end of said locking wedge for releasing and tipping up said wedge to engage said smooth rounded surface against said serrations on said strap to release said serrations on said wedge from said serrations on said strap, (H) a stop means on each end of said locking wedge adapted to engage said locking yoke to limit travel of said locking wedge in said yoke.

3. A cable tie and anchor comprising in combination:

(A) an elongated flexible strap having, (B) a series of serrations spaced longitudinally on the outside surface of said strap and having a smooth inside surface, (C) a platen formed on one end of said strap having a smooth outer surface, (D) a locking yoke on said platen above said smooth outer surface of said platen having a smooth surface wedge-receiving opening, (E) a locking wedge within said wedge-receiving opening having serrations on one face engaging said serrations on the outside of said strap and a smooth sloping surface engaging said locking yoke, (F) a smooth rounded surface on the small end of said locking wedge, (G) a manipulating extension portion on the large end of said locking wedge for releasing and tipping up said wedge to engage said smooth rounded surface against said serrations on said strap to release said serrations on said wedge from said serrations on said strap, (H) and an anchor adapted to be secured to a supporting structure having spaced slots with engaging surface adapted to receive and support said strap by engagement within the inside smooth surface of said strap.

References Cited by the Examiner

UNITED STATES PATENTS

| 134,052 | 12/1872 | Gurley | 24—25 |
| 3,152,374 | 10/1964 | Round | 24—194 |

FOREIGN PATENTS

| 137,072 | 12/1921 | Great Britain. | |

WILLIAM FELDMAN, *Primary Examiner.*

J. L. JONES, *Examiner.*